Patented Oct. 2, 1928.

1,686,277

UNITED STATES PATENT OFFICE.

WILBUR H. JUDY, OF BUFFALO, NEW YORK, ASSIGNOR TO SUMET CORPORATION, OF BUFFALO, NEW YORK, A CORPORATION OF NEW YORK.

METALLIC COMPOSITION AND PROCESS FOR MAKING THE SAME.

No Drawing. Application filed August 9, 1923. Serial No. 656,522.

It is well known to those skilled in the art that a mixture of copper and lead produces a metallic composition, ideal for many purposes such as bearings, brake linings, and clutch plates, but when these two metals are melted and molded, there is a tendency to precipitate, whereby it is impossible to make a homogeneous casting. This is due largely to the presence of sulphur in the lead.

The principal object of my invention has been to overcome the difficulties above pointed out, and to provide a novel metallic composition and a process by which mixtures for such compositions can be made, the elements of which, when molded will not separate or segregate.

Another object has been to provide a process by which one or more of the elements of such compositions may be so treated as to substantially remove the sulphur content.

Another object has been to provide a process in which hydrogen, or other gases, substantially free from oxygen can be used in the purification of one or more of the elements of the composition.

Another object has been to provide a process, whereby homogeneous castings can be made from mixtures of copper and lead; copper lead, and tin; or other non-ferrous metal mixtures in an inexpensive and efficient manner.

In carrying out my process, I take metallic lead and melt the same in a suitable receptacle. When the lead is melted, I gradually increase its temperature to approximately 800° F. I then introduce into the molten mass pure hydrogen, or hydrogen substantially free from oxygen (preferably highly heated), or hydrogen combined with other non-oxidizing gases. This causes a violent agitation of the molten mass of the composition, and I allow this agitation to continue for a period of time ranging from one minute to ten minutes, depending upon the quantity of lead being treated, and the sulphur content. After treatment, the lead may be run into bars or pigs for future use, or it may be added immediately to the other metals used in making my metallic composition. The treated metallic lead is added to the required amount of commercially pure copper and commercially pure tin, and other metals, depending upon the physical characteristics of the composition being produced. The combined metals should be heated to a temperature ranging between 1850° F. and 2100° F. before the composition is poured into molds.

By commercially pure copper, I mean metallic copper produced by electrolytic precipitation, or other copper of equal purity.

I have found that after treating the lead as above desribed, the sulphur content varies from a maximum of approximately 1/100 of 1% to a mere trace.

In developing my invention, I have found that metallic compositions adapted for use in bearings, brake linings, and clutch plates require different physical characteristics to meet the various operating conditions. In order to secure the required physical characteristics, the proportions of copper, lead, tin, and other elements of my composition may vary from 50% of copper, 49½% of treated lead, and ½% of tin and other metals to 80% of copper, 10% of treated lead, and 10% of tin and other metals. Such mixtures produce metallic compositions of the class usually known as red metals, having melting points at approximately 1650° F.

I have also found that in order to meet certain conditions, it is necessary to have a low melting point composition, commonly known as babbitt or white metal. In order to meet this condition, I use the same metals as above described, but combine them in different proportions, varying from 90% of treated lead, and 10% of copper, tin, and other metals to 20% of treated lead, and 80% of copper, tin, and other metals. Such mixtures produce compositions of low melting points ranging from 450° F. to 480° F.

Having thus described my invention, what I claim is:

1. A metallic composition comprising 70% of copper, 26% of lead purified by treatment with hydrogen to the exclusion of oxygen, and 4% of tin.

2. A metallic composition varying in proportions from 50% of copper, 49½% of lead which has been purified by treatment with hydrogen to the exclusion of oxygen, and ½ of 1% of tin to 80% of copper, 10% of such treated lead and 10% of tin.

3. A metallic composition comprising not less than 50% of copper, not less than 10% of lead purified by treatment with hydrogen to the exclusion of oxygen, and a relatively small amount of tin, not exceeding 10%

4. The method of purifying lead which consists in introducing hydrogen to the exclusion of oxygen into the mass of metal when such metal is in a molten condition.

5. The method of purifying lead which consists in introducing highly heated hydrogen at low pressure and to the exclusion of oxygen, into the mass of metal while such metal is in a molten condition.

6. The method of preventing the separation of lead and copper in a molten lead-copper alloy which is characterized by passing substantially pure hydrogen to the exclusion of oxygen through molten commercial lead, and thereafter mixing such lead in desired proportions with molten copper.

In testimony whereof, I have hereunto signed my name.

WILBUR H. JUDY.